US006647850B2

(12) United States Patent
Verklan

(10) Patent No.: US 6,647,850 B2
(45) Date of Patent: Nov. 18, 2003

(54) FOOD SLICING APPARATUS

(76) Inventor: Nick Verklan, Apt. 105, 11441-132 Street, Edmonton, Alberta (CA), T5M 1TG2

( * ) Notice: Subject to any disclaimer, the term of this patent is extended or adjusted under 35 U.S.C. 154(b) by 102 days.

(21) Appl. No.: 09/683,287

(22) Filed: Dec. 10, 2001

(65) Prior Publication Data

US 2002/0059859 A1 May 23, 2002

Related U.S. Application Data

(63) Continuation-in-part of application No. 09/512,298, filed on Feb. 24, 2000, now abandoned.

(51) Int. Cl.[7] .......... B23D 7/06

(52) U.S. Cl. .......... 83/874; 83/427; 83/436.1; 83/436.6; 83/932; 83/446; 83/422

(58) Field of Search .......... 83/356.2, 422, 83/427, 762, 870, 871, 874, 932, 436.1, 436.6, 444, 446, 423, 420, 431, 435, 445, 758; 99/349

(56) References Cited

U.S. PATENT DOCUMENTS

| | | | | | |
|---|---|---|---|---|---|
| 3,583,026 | A | * | 6/1971 | Peoni | 452/16 |
| 3,875,840 | A | * | 4/1975 | Moorman | 83/431 |
| 4,261,257 | A | * | 4/1981 | Henderson et al. | 99/349 |
| 4,399,989 | A | * | 8/1983 | Baillie | 83/762 |
| 4,530,276 | A | * | 7/1985 | Miller | 99/349 |
| 4,653,363 | A | * | 3/1987 | Lang | 83/30 |
| 5,404,782 | A | * | 4/1995 | Ryan et al. | 83/874 |
| D378,972 | S | * | 4/1997 | Hug et al. | D7/381 |
| 5,690,013 | A | * | 11/1997 | Kanarek et al. | 83/762 |
| 5,732,610 | A | * | 3/1998 | Halladay et al. | 83/871 |
| 5,921,163 | A | * | 7/1999 | McInnes et al. | 83/870 |
| 5,970,851 | A | * | 10/1999 | Masel et al. | 99/334 |
| 6,145,427 | A | * | 11/2000 | Smith | 83/874 |

* cited by examiner

*Primary Examiner*—Boyer D. Ashley
*Assistant Examiner*—Thomas J Druan, Jr.
(74) *Attorney, Agent, or Firm*—Bennett Jones LLP

(57) ABSTRACT

A bagel or bun slicing apparatus includes a frame mounted to a vertically adjustable stand and base. The frame defines a vertical channel which houses a reciprocating blade and rollers for transporting the bagel or bun through the channel and across the blade. The rollers are rotated by an electric motor which also reciprocates the blade. The rollers and/or a guide plate may be laterally adjustable to allow for bagels or buns of varying widths.

10 Claims, 11 Drawing Sheets

FOOD SLICING APPARATUS

CROSS REFERENCE TO RELATED APPLICATIONS

This application is a continuation-in-part of application Ser. No. 09/512,298 filed Feb. 24, 2000, now abandoned.

BACKGROUND OF INVENTION

The present invention relates to an apparatus for slicing foods and, in particular, to a bagel or bun slicing apparatus.

Bagels are a popular food product, as are buns and the like. Almost invariably, a bagel or a bun is served sliced into two disk-shaped halves. This is not an easy manual operation and uniform cuts while avoiding cutting one's hand may be difficult to achieve. Simple manual bagel slicers exist which involve a guillotine action or a knife guide coupled with a bagel holder. However, these devices are not entirely satisfactory from a safety and ease-of-use point of view.

An automatic bagel slicer is disclosed in U.S. Pat. No. 5,690,013 which includes a bagel holding mechanism and a knife blade which is both reciprocated and moved vertically to slice the bagel. Separate motor mechanisms are used to perform these two functions. As a result of having separate motors acting on the knife blade in different ways, the mechanisms are quite complex and costly to manufacture.

Therefore, there is a need in the art for an automated food slicer, and a slicer for bagels or buns in particular, which mitigates the difficulties of the prior art.

SUMMARY OF INVENTION

The present invention is directed to a food slicing apparatus which is particularly adapted for slicing bagels, buns and other breads. In one aspect of the invention, the apparatus comprises: (a) a frame comprising two opposed end plates and a guide plate spanning between the end plates, said frame forming a closed channel through which food may pass, wherein said guide plate is mounted to the frame in a manner permitting lateral movement of the guide plate so as to widen or narrow the width of the channel; (b) biasing means for urging the guide plate to a position which narrows the width of the channel; (c) an elongate cutting blade positioned within and across the channel, parallel to the guide plate; (d) a roller opposite to the guide plate and rotatably mounted to the frame for gripping and moving food through the channel and through the cutting blade, said roller comprising a surficial gripping element which grips the food and wherein the roller is mounted to the frame such that the roller may move laterally so as to widen or narrow the width of the channel; (e) biasing means for urging the roller to a position which narrows the width of the channel; (f) a motor for rotating the roller; and (g) power transmission means connecting the motor to the roller.

In one embodiment, the power transmission means comprises a flexible drive wire which is driven by the motor and which rotates the roller. In an alternative embodiment, the power transmission means may comprise an elongate worm gear which drives a ring gear attached to the roller.

In one embodiment, the apparatus comprises two rollers which are both rotated in the same direction by the motor and the power transmission means.

In one embodiment, the cutting blade is mounted to the frame such that the blade may move across the channel in a reciprocating manner. This embodiment may further comprise a motor and power transmission means for reciprocating the blade. The motor may be the same motor which drives the rollers. The reciprocating power transmission means may comprise a drive body attached to the blade and defining a transverse slot which mates with a pin attached to a pinion gear driven by the motor, such that rotation of the pin causes reciprocating movement of the drive body and blade.

In one embodiment, the frame is mounted to a stand and a base wherein the stand permits adjustment of the vertical height of the frame above the base.

BRIEF DESCRIPTION OF DRAWINGS

Embodiments of the invention will now be described by way of an exemplary embodiment with reference to the accompanying simplified, diagrammatic, not-to-scale drawings. In the drawings.

DETAILED DESCRIPTION

The apparatus (A) according to the Figures comprises a food slicing apparatus which is particularly adapted to slicing bagels, buns and other bread products. The foregoing description shall refer to the object being sliced as a bagel. However, a person skilled in the art will be able to modify the disclosed embodiments to the extent necessary to adapt the apparatus to slicing other foods without departing from the scope of the invention. It is intended that such modifications be included within the scope of the claims herein.

Figure 1:
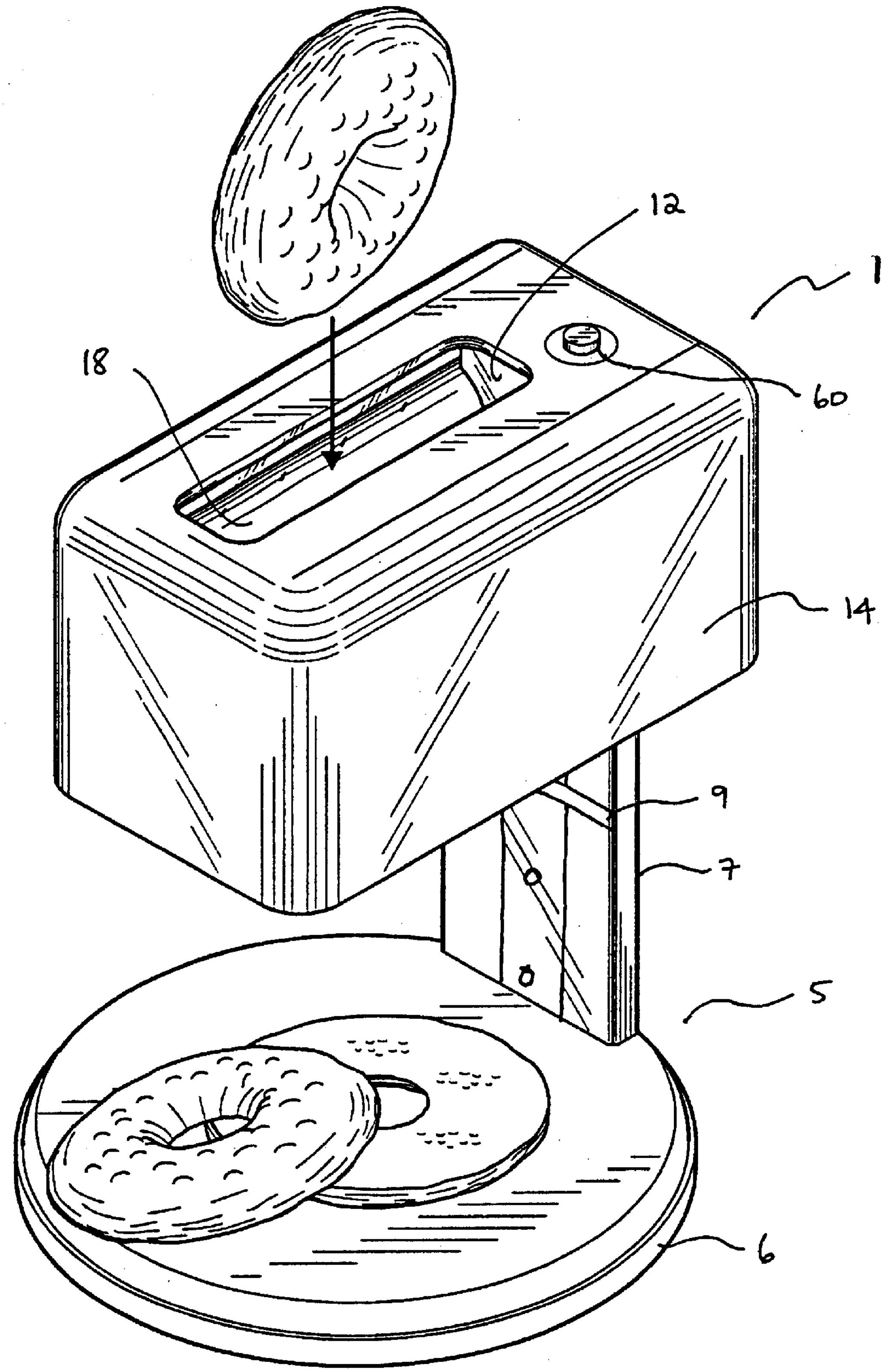
FIG. 1 is a perspective view of one embodiment of the invention.

In one embodiment, the apparatus (A) comprises a stand (5), a frame (12) and a housing (14) which are typical of small kitchen appliances. The stand (5) includes a base (6) and a upright support (7). The components of the apparatus (A) are mounted to or supported by the frame (12) while the housing (14) serves as a decorative and protective cover. The specific configuration of the frame (12) is not an essential element of the invention. The housing (14) is not an essential element of the invention. The frame defines a channel (16) having a top opening (18) which is illustrated in FIG. 1 and in top plan view in FIG. 2. Although the embodiments illustrated herein have the channel (16) oriented vertically, the orientation of the channel is not an essential element.

Figure 1A:
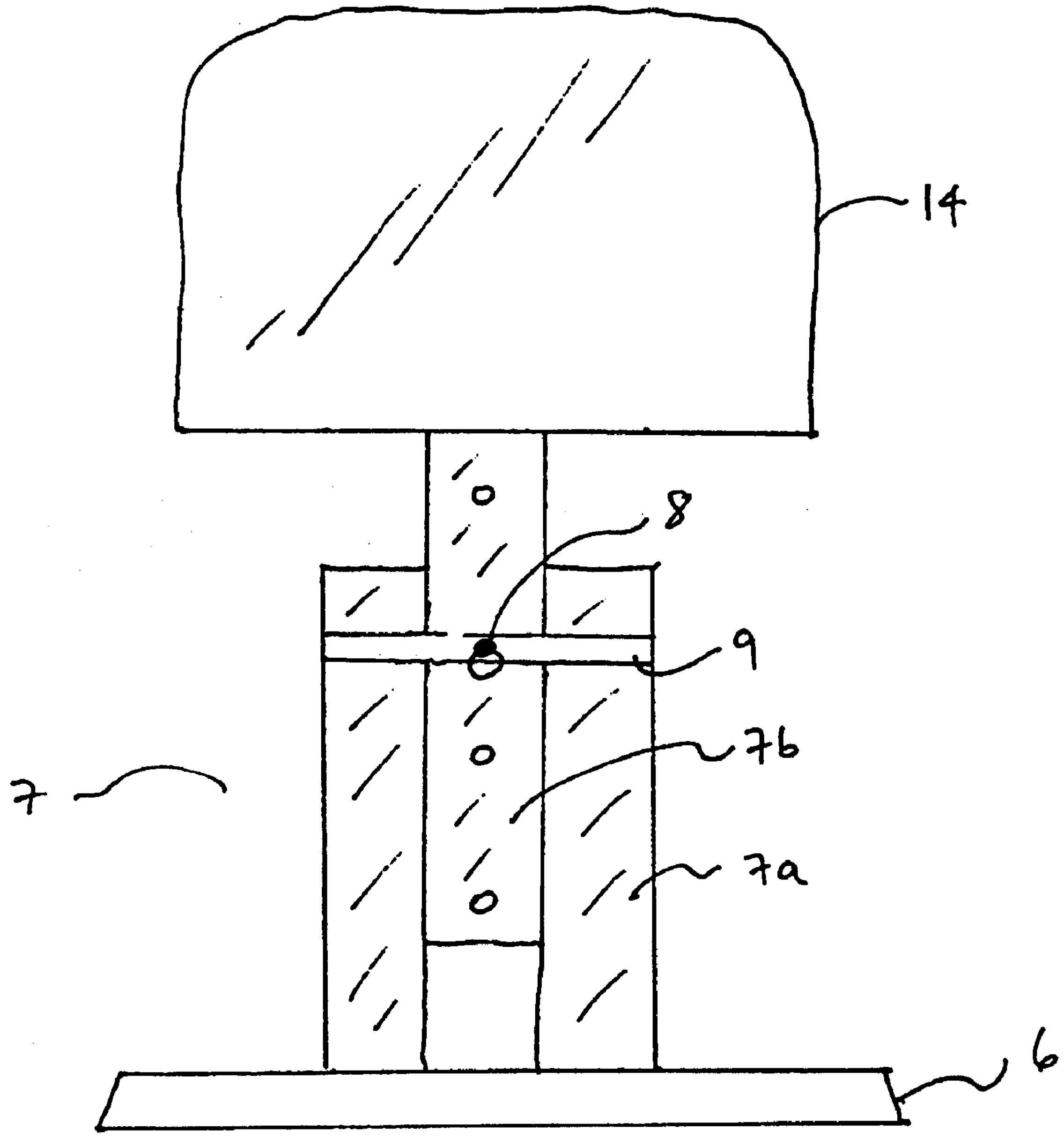
FIG. 1A is an end view showing the adjustable stand of one embodiment.

In one embodiment, the upright support (7) may be adjustable for height as is shown in FIG. 1A. The upright support (7) may include separate pieces (7*a*, 7*b*) which slidingly or telescopingly engage each other to provide such adjustability. A locking pin (8) and bar (9) may be provided to secure the support (7) in its extended position.

Figure 2:
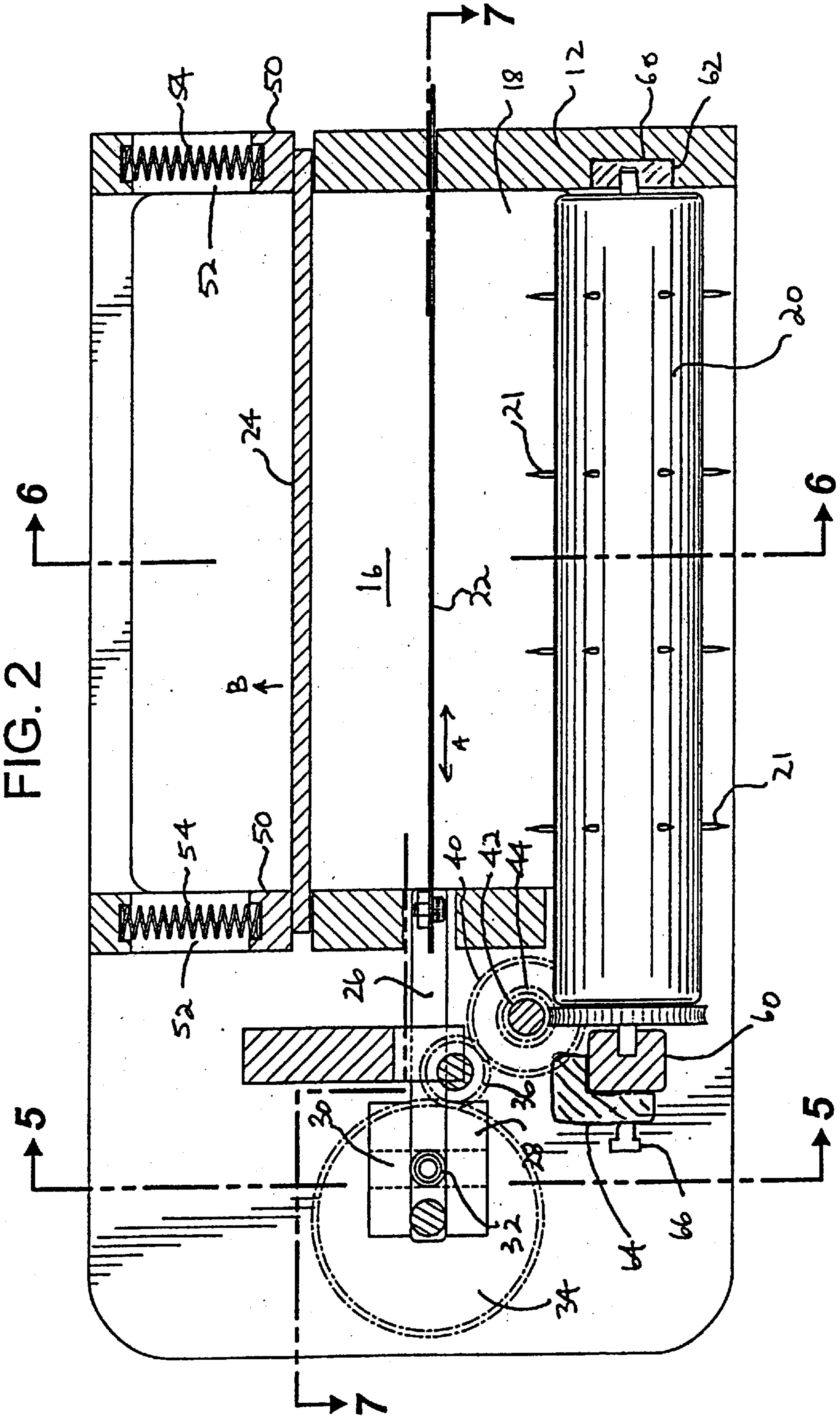
FIG. 2 is a top plan view of the embodiment shown in FIG. 1 with the housing removed.
Figure 3:
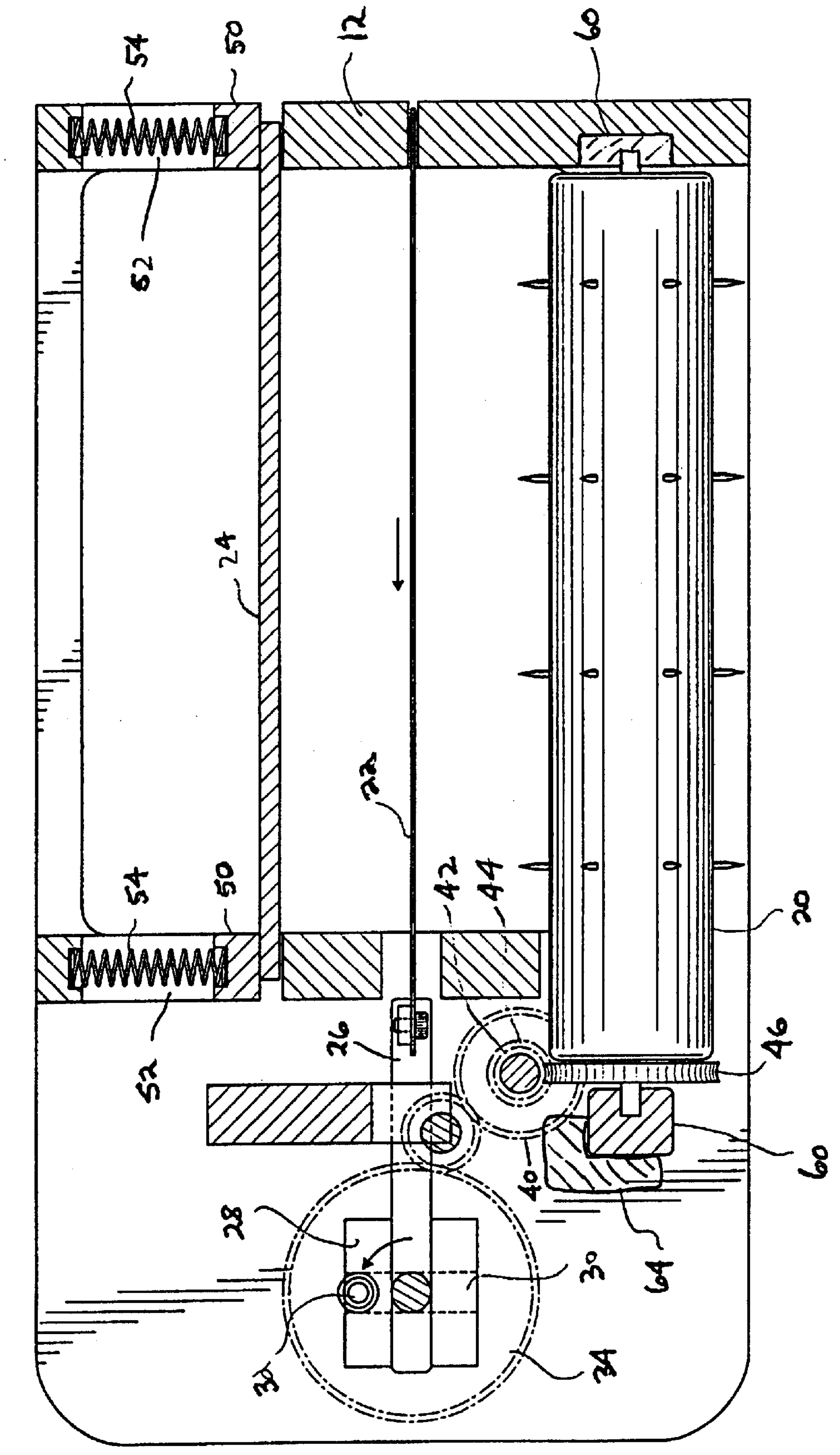
FIGS. 3 and 4 are the same view shown in FIG. 2 showing movement of the blade and the blade power transmission means.
Figure 4:
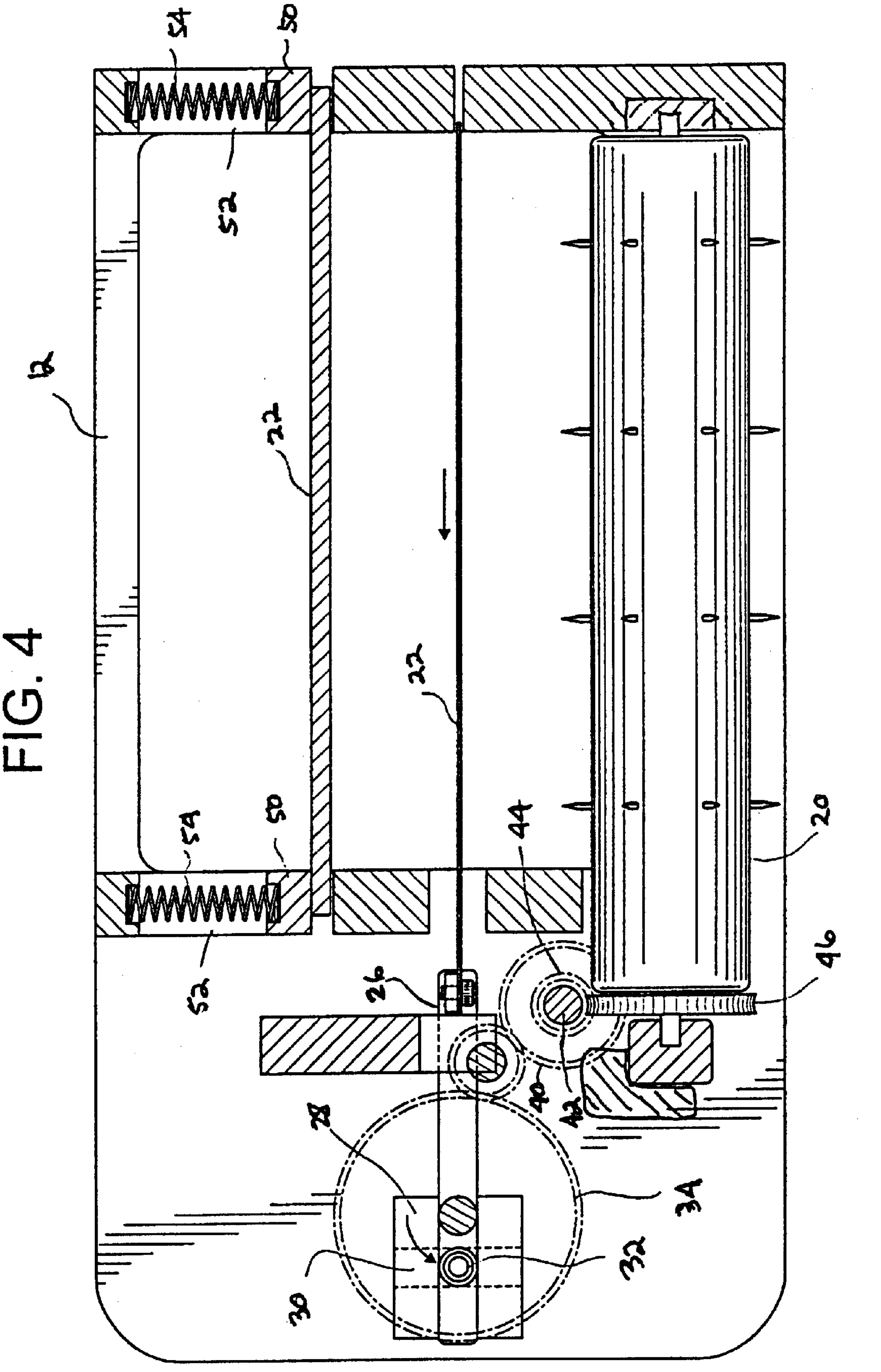
Figure 5:
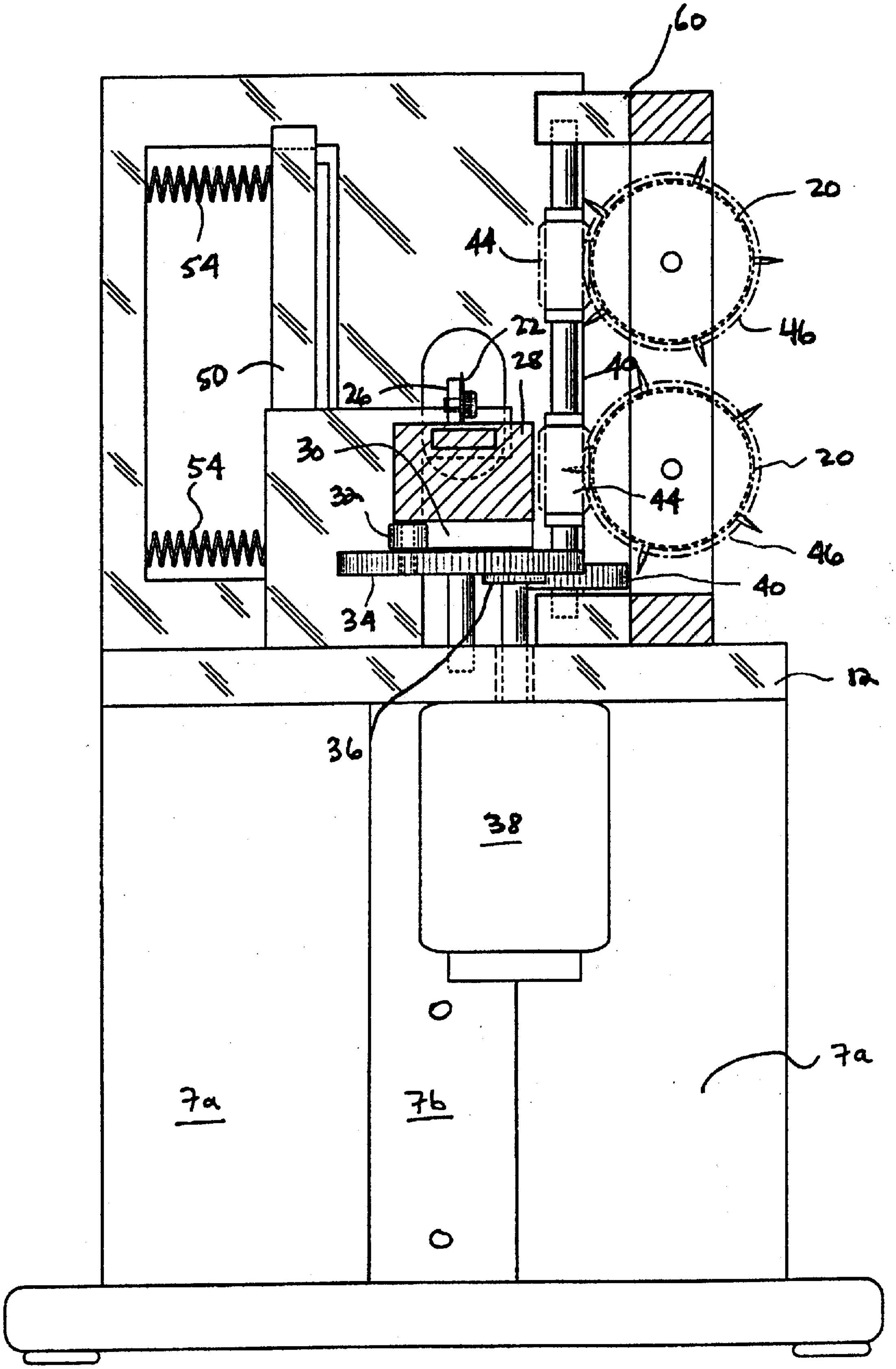
FIG. 5 is a cross-sectional view along line 5—5 in FIG. 2 showing the motor and power transmission means in one embodiment.
Figure 7:
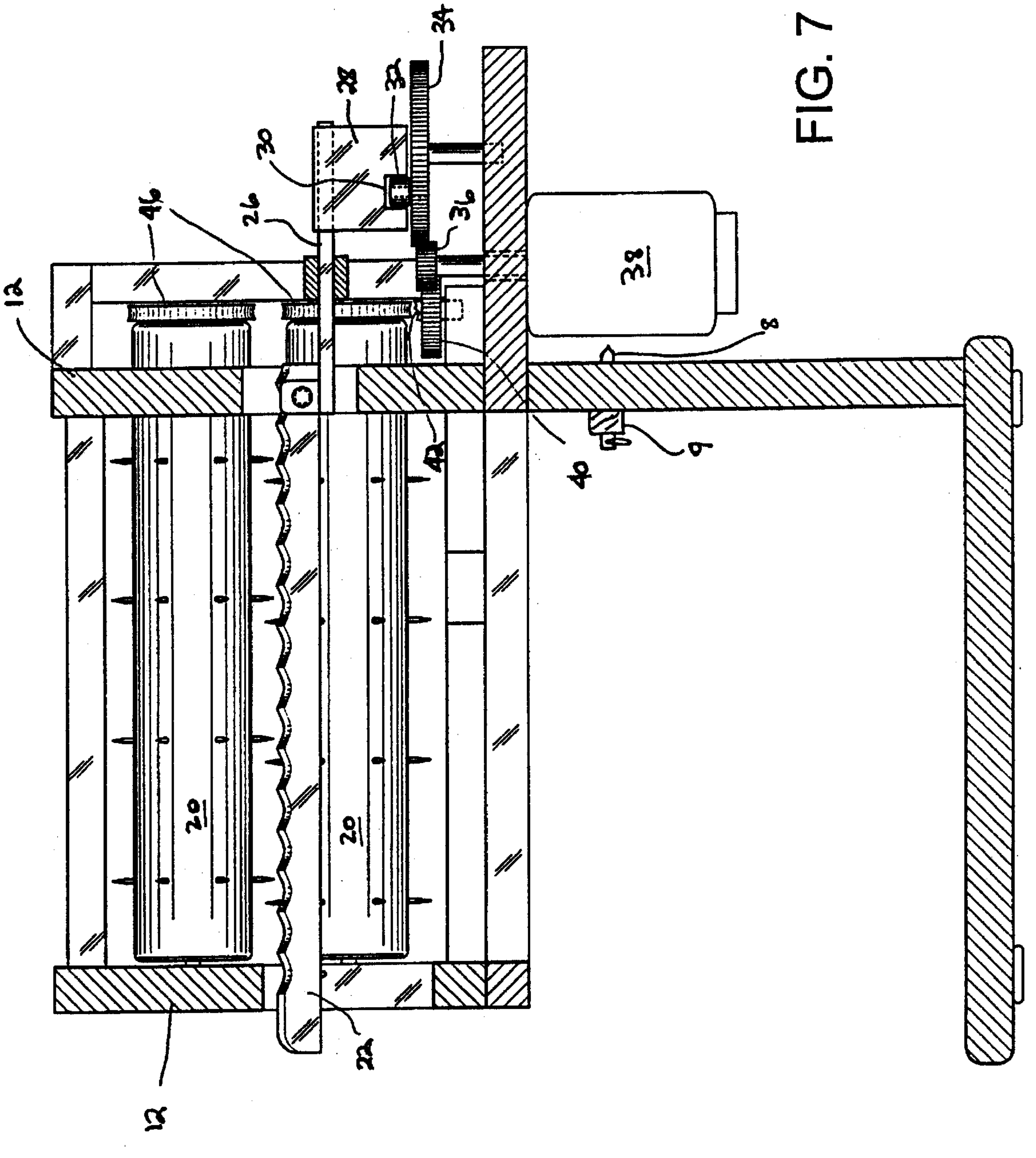
FIG. 7 is a vertical cross-sectional view along line 7—7 in FIG. 2.

Referring to FIG. 2, rollers (20) are rotatably mounted to the frame (12). In one embodiment, the rollers (20) have a plurality of small spikes (21) which grip the bagel and pass it through the channel (16) when the rollers (20) are rotated. Disposed within and across the channel (16) is a cutting blade (22) which is fixed in the vertical plane but, in one embodiment, may move laterally across the channel (16) in a reciprocating manner, as shown by arrow A in FIG. 2. As shown in FIGS. 2 and 7, the blade (22) is mounted to a link arm (26) which is attached to a block (28). The block (28) has a transverse slot (30) which engages a pin (32) mounted eccentrically on a wheel (34). The wheel (34) is rotated by a drive gear (36). As may be seen in FIGS. 3 and 4, rotation of the wheel (34) causes the pin (32) to orbit the centre of the wheel (34). As a result, lateral reciprocating motion is imparted to the blade (22) by means of the block (28) and the link arm (26). The specific mechanism to reciprocate the blade (22) is not intended to be limiting of the invention, except where specifically claimed as such. One skilled in the art may conceive of alternative mechanisms to reciprocate the blade.

The spikes (21) are one example of a surficial gripping element to grip the bagel and pass it through the channel. One skilled in the art may conceive of many alternatives to accomplish the same task. For example, the roller may have a rubber textured surface such as a plurality of ribs or nubs where the rubber provides frictional engagement of the bagel, aided by the surface texture. Alternatively, the rollers (20) may drive a rubber belt (not shown).

The drive gear (36) is driven by an electric motor (38) which may be a conventional DC or AC electric motor used in small appliances or tools. The drive gear (36) rotates the wheel (34) to reciprocate the blade (22) as described above. In one embodiment, the drive gear (36) also rotates the rollers (20) by means of an idler gear (40) which is attached to a vertically disposed shaft (42). The shaft (42) has worm gear sections (44) which engages roller gears (46) to rotate both rollers (20).

Figure 6:
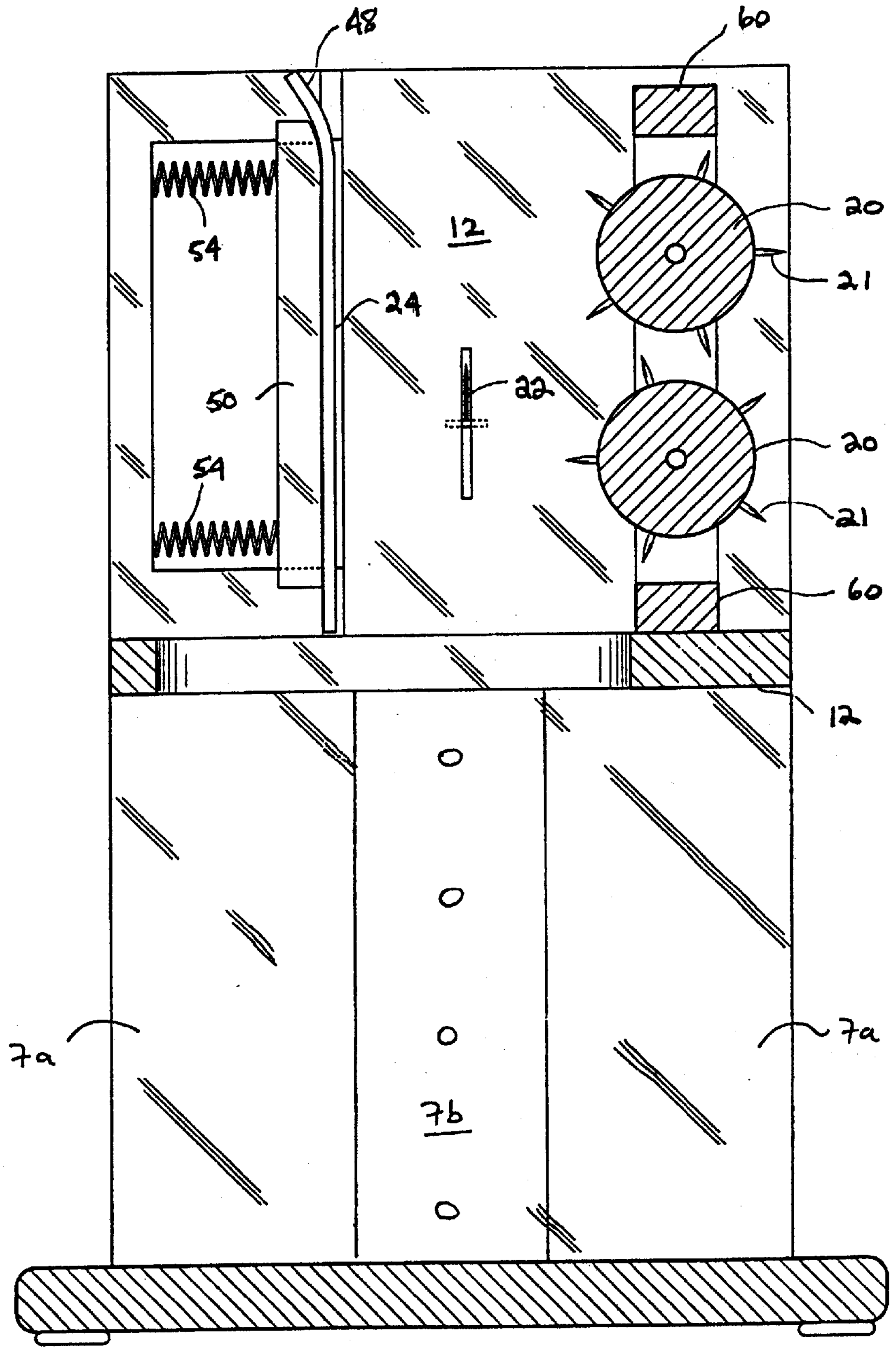
FIG. 6 is a cross-sectional view along line 6—6 in FIG. 2.

Referring to FIG. 6, a guide plate (24) is provided opposite the rollers (20) which provides a vertical guide for the bagel as it passes through the channel (16). The guide plate (24) has an outwardly curved top portion (48) to facilitate entry of the bagel into the channel (16) and lateral tabs (49) which slide within openings (52) in the frame (12). Guide members (50) disposed in the openings (52) slidingly engage the upper and lower edges of the openings and bear against the guide plate tabs (49). The guide plate (24) may be inserted into the frame through slots (53). As may be seen in FIG. 2, the guide plate (24) may move in the direction of arrow "B" to widen the channel (16) in order to accommodate bagels of varying widths. Biasing means in the form of springs (54) urge the guide plate (24) towards the rollers (20). Preferably, the distance between the guide plate in its extended position and the rollers (20) is slightly smaller than a small bagel. In that case, all bagels will displace the guide plate (24) to some degree and will therefore be urged against the rollers (20) to ensure that the rollers (20) are effective in transporting the bagel through the channel (16).

In one embodiment, the rollers (20) are mounted in a subframe (60) which engages a slot (62) in the frame (12) at one end and a support post (64) at the other end. The subframe (60) may be secured in position by a pin (66) which passes through the support post (64) and engages the subframe. As is apparent from the Figures, once the pin (64) is disengaged, the subframe (60) may be removed from the frame. In one embodiment, the idler gear (40) and shaft (42) are also mounted to the subframe (60).

Figure 8:
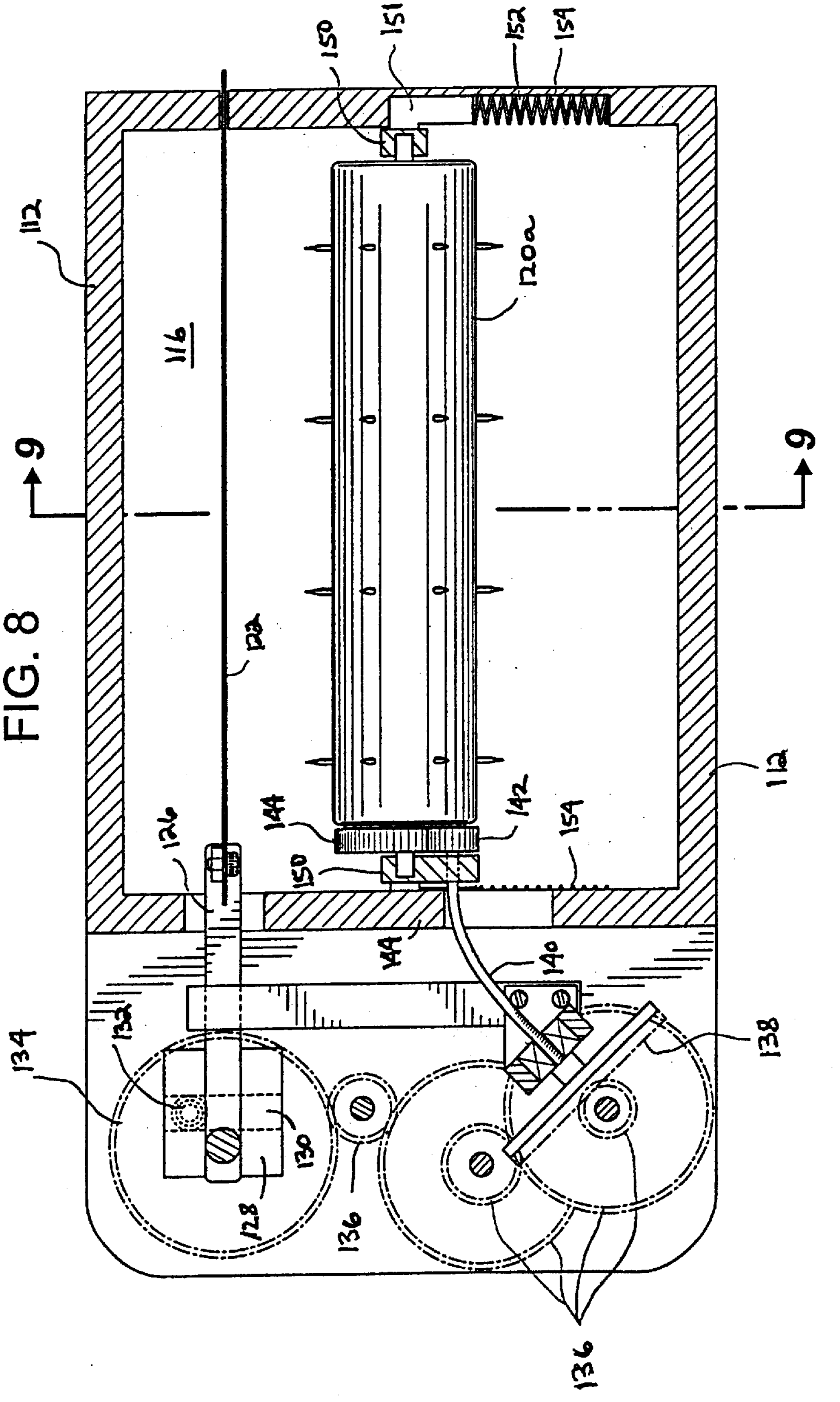
FIG. 8 is a top plan view of an embodiment showing an alternative power transmission means for rotating the rollers and reciprocating the blade.
Figure 9:
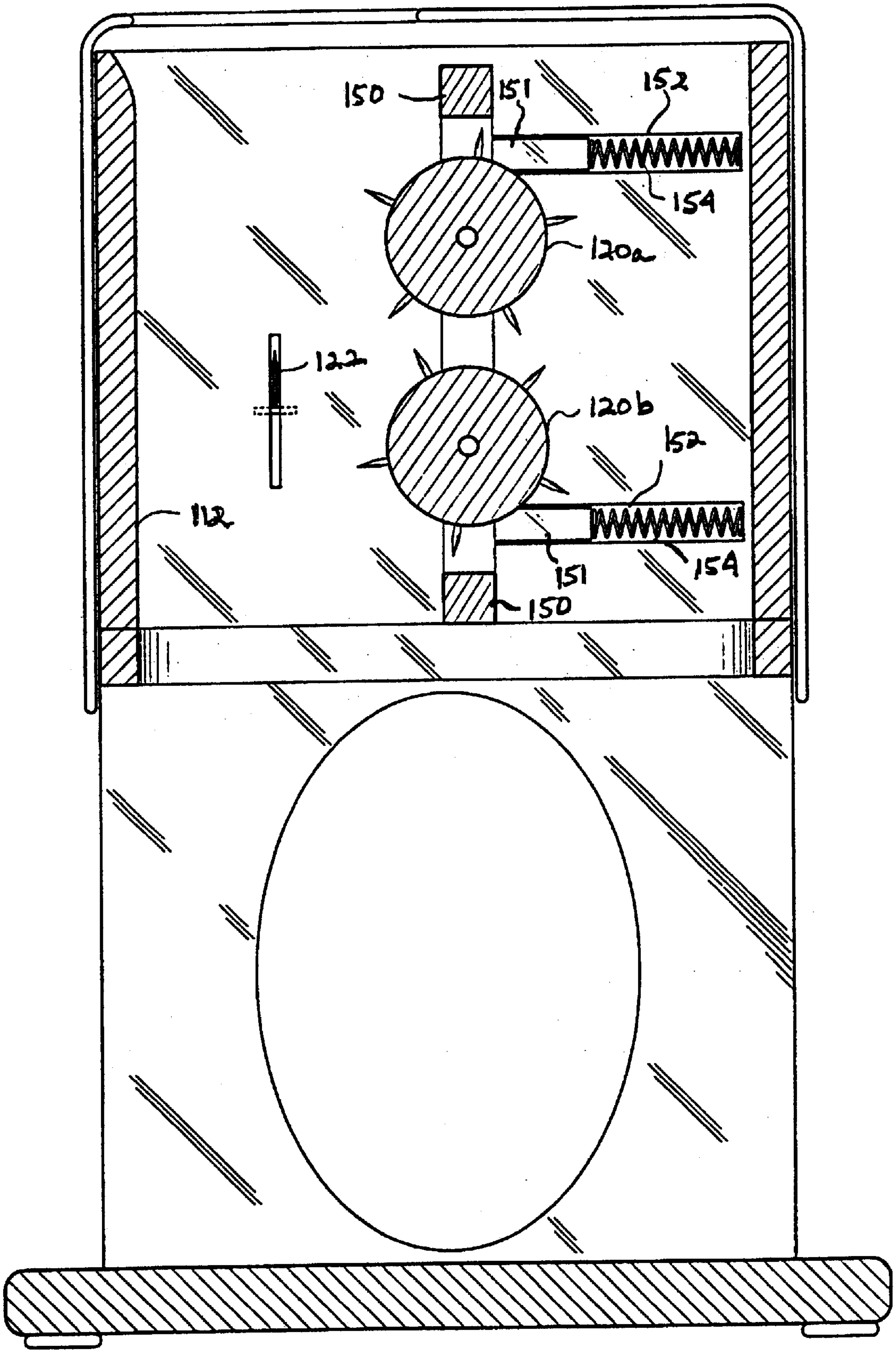
FIG. 9 is a vertical cross-sectional view along line 9—9 in FIG. 8.

An alternative embodiment of the invention is illustrated in FIGS. 8 and 9. In this embodiment, the width of the channel (116) is varied by lateral movement of the rollers. As shown in FIG. 8, the rollers (120) are mounted to a subframe (150) which is mounted on support members (151) matched to channels (152) provided in the frame (112). The subframe is biased towards the cutting blade (122) by means of springs (154) disposed within the channels (152). The embodiment illustrated in FIG. 9 does not have the optional extendable stand (7) as is shown in the other Figures.

Figure 10:
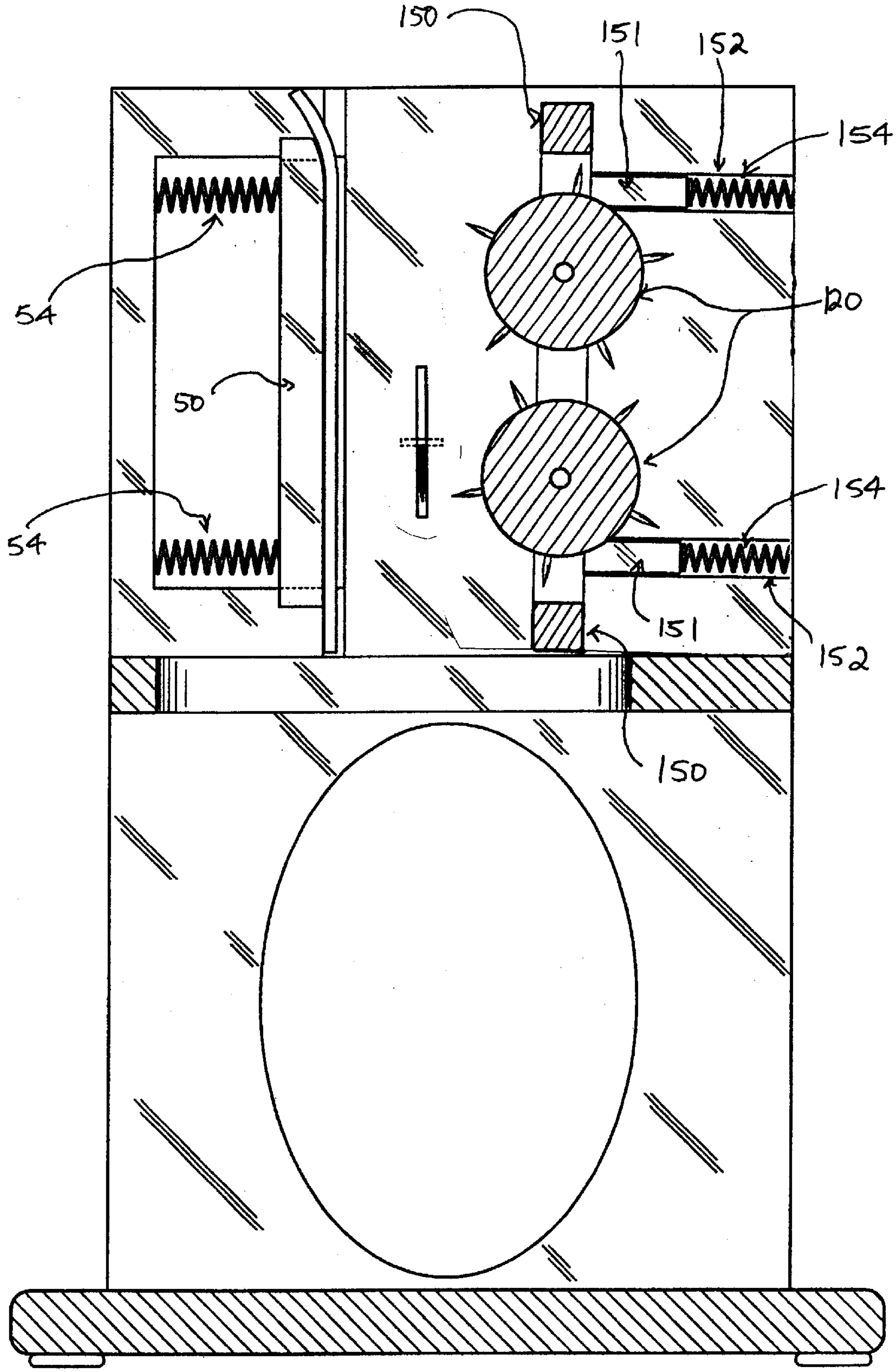
FIG. 10 is a vertical cross-sectional view of an alternative embodiment of the invention.

In a further alternative embodiment, as shown in FIG. 10, the width of the channel (116) is varied by lateral movement of the rollers, in the same manner as shown in FIGS. 8 and 9 and also by lateral movement of the guide plate (24) as is illustrated and described above with reference to FIG. 6. In this manner, any foodstuffs passing through the channel will be centred on the blade (122) because both the guide plate (24) and the rollers (12) expand laterally.

The blade (122) is reciprocated by means similar to that shown in FIG. 2 above. A wheel (134) having an offset pin (132) engages a transverse slot (130) in a block (128). The block is linked to the blade by a link arm (126). The wheel (134) is rotated by a drive gear (136) which is driven by an electric motor (not shown). The drive gear also causes rotation of the rollers (120) by an alternative configuration of gears (136) which drives an upright bevel gear (138) which rotates a flexible shaft (140). The flexible shaft (140) passes through an opening in an upright partition (144) part of the frame (112) and drives a spur gear (142) which rotates a roller gear (144) on the upper roller (120*a*). The upper roller (120*a*) then drives the lower roller (120*b*) by means of an intermediary spur gear (not shown).

The apparatus may include a switch (60) on the exterior of the housing (14) for turning the motor on and off. Alternatively or additionally, the operation of the apparatus may be automated by providing means (not shown) for sensing the entry and exit of a bagel in the channel (16). Such means may include a pressure switch or an optical beam, which are well known in the art. The sensing means may then be operatively connected to a switch for turning the motor on or off.

As will be apparent to those skilled in the art, various modifications, adaptations and variations of the foregoing specific disclosure can be made without departing from the scope of the invention claimed herein.

What is claimed is:

1. A food slicing apparatus comprising:

(a) a frame comprising two opposed end plates and a guide plate spanning between the end plates, said frame forming a closed channel trough which food may pass, wherein said guide plate is mounted to the frame in a manner permitting lateral movement of the guide plate so as to widen or narrow the width of the channel;

(b) biasing means for urging the guide plate to a position which narrows the width of the channel;

(c) an elongate cuffing blade positioned within and across the channel, parallel to the guide plate;

(d) at least one a roller opposite to the guide plate and rotatably mounted to the frame for gripping and moving food through the channel and through the cuffing blade, wherein the roller is mounted to the frame such that the roller may move laterally so as to widen or narrow the width of the channel;

(e) biasing means for urging the roller to a position which narrows the width of the channel;

(f) a motor for rotating the roller; and (g) power transmission means connecting the motor to the roller.

2. The apparatus of claim 1 wherein the at least one roller comprises a surficial gripping element which grips the food.

3. The apparatus of claim 2 wherein the surficial gripping element comprises a plurality of spikes.

4. The apparatus of claim 1 wherein the power transmission means comprises a flexible drive wire which is driven by the motor and which rotates the roller.

5. The apparatus of claim wherein the roller comprises two rollers which are both rotated in the same direction by the motor and the power transmission means.

6. The apparatus of claim 1 wherein the cutting blade is mounted to the frame such that the blade may move across the channel in a reciprocating manner.

7. The apparatus of claim 6 further comprising means for reciprocating the blade.

8. The apparatus of claim 7 wherein the blade reciprocation means comprises the same motor which drives the rollers.

9. The apparatus of claim 8 wherein the blade reciprocation transmission means comprises a drive body attached to the blade and defining a transverse slot which mates with a pin attached to a pinion gear driven by the motor, such that rotation of the pin causes reciprocating movement of the drive body and blade.

10. The apparatus of claim 1 wherein the frame is mounted to a base and an upright support member wherein the support member permits adjustment of the vertical height of the frame above the base.

* * * * *